United States Patent
Evans

(10) Patent No.: US 6,188,875 B1
(45) Date of Patent: Feb. 13, 2001

(54) WIRELESS TELEPHONE SERVER SYSTEM

(75) Inventor: Shane Evans, Evergreen, CO (US)

(73) Assignee: R.F. Cellutions, LLC, Denver, CO (US)

(*) Notice: Under 35 U.S.C. 154(b), the term of this patent shall be extended for 0 days.

(21) Appl. No.: 09/008,603

(22) Filed: Jan. 17, 1998

(51) Int. Cl.[7] .................................................. H04B 7/14
(52) U.S. Cl. ................. 455/15; 455/19; 455/561
(58) Field of Search ....................... 455/8, 9, 11.1, 455/15, 19, 20, 24, 560, 562, 517, 524, 561

(56) References Cited

U.S. PATENT DOCUMENTS

| | | | |
|---|---|---|---|
| 4,849,963 | * 7/1989 | Kawano et al. | 455/15 |
| 4,868,886 | * 9/1989 | Assal et al. | 455/17 |
| 5,168,574 | * 12/1992 | Gordon | 455/20 |
| 5,187,806 | * 2/1993 | Johnson et al. | 455/15 |
| 5,548,803 | * 8/1996 | Evans | 455/17 |

* cited by examiner

*Primary Examiner*—Edward F. Urban
(74) *Attorney, Agent, or Firm*—Edwin H. Crabtree; Ramon L. Pizzaro; Donald W. Margolis

(57) ABSTRACT

A wireless telephone server system used for reproducing a wireless base station signal and introducing the reproduced signal in a new geographical area. The system reproduces or clones a full, high power operating cell site or cell unit of the same electromagnetic magnitude at a reduced cost. The wireless telephone system includes a parabolic collector operating in a frequency range of 140 Mhz to 2 Ghz and with a magnitude inner gain in a range of 14 to 21 dBw. A server antenna is connected to the parabolic collector using matching feedline jumpers to produce a resonant match. The server antenna is designed to provide a "under and over" null to the main lobe of the antenna at a minimum of 40 dBw. The system includes a plurality of duplexing devices with a bi-directional amplifier which allows 124 dBw of isolation between the parabolic collector and server antenna. Also, the system includes low-noise amplifiers that are adjustable from 1 to 12 dBw in system gain. Further, the system includes either a mini-unit amplifier or a full-unit amplifier operating in a range of 40 to 140 watts. Each amplifier is designed not to allow any inter-modulation signal to develop to more than −68 dBw from the amplitude of the main carrier. The amplifiers insure interference free operation. The system also includes lightning arrestors, 50 ohm feedline jumpers and a weather-proof housing if required for storing the system therein.

18 Claims, 3 Drawing Sheets

WIRELESS TELEPHONE SERVER SYSTEM

BACKGROUND OF THE INVENTION (a) Field of the Invention

This invention relates to a wireless telephone system and more particularly, but not by way of limitation, to a system for expanding the geographic coverage of a cell site operating signal foot-print. More specifically, the system is designed to reproduce a wireless base station's signal footprint and introduce the cloned foot-print into new geographical areas to the benefit of cellular telephone users.

(b) Discussion of Prior Art

In today's wireless telephone market there are several units which produce coverage other than a wireless base station site. The units are used for expanding wireless signal coverage and are described as follows:

Fiber optic micro cell site: This type of site produces its own frequencies that are different from adjacent cell sites. Each sites primary function is to introduce low-power cellular signal footprints into small geographical areas that don't have a need for a high-power signal footprint.

Bi-directional amplifier: This type of unit re-radiates operating frequencies at a composite output power of 3 watts maximum. This means that multiple carriers are reduced to powers in a milli-watt range.

Cell extender: This unit is limited to communicating only to a donor cell. The cell extender can produce equal power but operates at different frequencies and is limited to a maximum of 10 channels. Also, the cell extender ties up channel banks within the cellular base station, making it a very inefficient operating system.

In U.S. Pat. No. 5,187,806 to Johnson et al. an apparatus and method for expanding cellular system capacity is disclosed. This system uses a cell site transceiver and a remote site transceiver to extend a cell site to a remote location within a geographic sector. The patents cited in U.S. Pat. No. 5,187,806 are incorporated herein by reference.

None of the above mentioned cellular systems provide a powerful, compact and easily transportable system that reproduces the same signal magnitude of its donor site and does not require the need to use channel banks. The subject invention speaks to adjacent cell sites as if it was a real, full-blown cell site itself. The adjacent cell sites don't know or see any difference in the cloning unit.

SUMMARY OF THE INVENTION

In view of the foregoing, it is a primary object of the subject invention to provide a wireless telephone system which is used for reproducing a wireless base station signal and introducing the reproduced signal in a new geographical area.

Another object of the invention is to provide a system that reproduces or clones a full, high power operating cell site or cell unit of the same electromagnetic magnitude at a greatly reduced cost. The system can also be used to clone itself for providing additional geographical areas covered by a reproduced wireless signal from the base station signal.

Yet another object of the invention is to provide a cell site that can operate up to 300 watts of effective radiated power (ERP) Also the cell site is able to function under any of the current technologies operating today such as Analog, TDMA, CDMA and FLEX.

Still another object of the subject wireless system is to provide a cost-effective alternative to building an expensive full cell site. The system produces a broad signal footprint giving wireless customers solid signal coverage along with reliable service.

Another object is the subject invention operates without radios and combining systems. The system clones the donor cell site signal as a whole. If a donor host site operates on 14 channels, then the subject system will also operate on 14 channels. If the donor host site is expanded to 28 channels, then the subject system will automatically expand itself to 28 channels with only a 3 db loss to the coverage footprint. Unlike a cell extender that is currently limited to hand-offs with its donor, the subject cell reproduction system will hand-off to all adjacent cells and its donor. Because the system is a linear composite system, it can be engineered to handle coverage objectives based on future growth. For example, if a site is designed to cover a town or a given geographical area where the donor cell operates 14 voice channels, then the cloned system can be designed to cover 28 voice channels. This feature will allow a cellular service-engineering group the ability to perform channel expansions without signal loss of the designed system or a need to perform modifications to the cloned system.

A further advantage of the system is the design helps our environment by reducing the need of adding additional large radio towers and large obstructions when expanding cell coverage to new geographic areas.

The subject wireless server system includes a 4 to 10 foot parabolic collector operating typically in a frequency range of 800 to 900 Mhz and with a magnitude inner gain in a range of 14 to 21 dBw. A server antenna is connected to the parabolic collector using matching feedline jumpers to produce a resonant match through the system. The server antenna is designed to provide a "under and over" null to the main lobe of the antenna at a minimum of 40 dBw. The system includes 4 duplexing devices with a bi-directional amplifier which allows 124 dBw of isolation between the collector and the server antenna. Also, the system uses two low-noise amplifiers that are adjustable from 1 to 12 dBw in system gain. Further, the system includes either a 40 watt mini-unit amplifier or a 140 watt full-unit amplifier. Each amplifier is designed not to allow any inter-modulation signal to develop to more than −68 dBw from the amplitude of the main carrier. The amplifiers insure interference free operation. The system also includes lightning arrestors, 50 ohm feedline jumpers and a weather-proof housing if required for storing the system therein. A 110 volt electrical supply is connected to the system plus a 240 volt supply if required.

These and other objects of the present invention will become apparent to those familiar with wireless telephone systems from the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
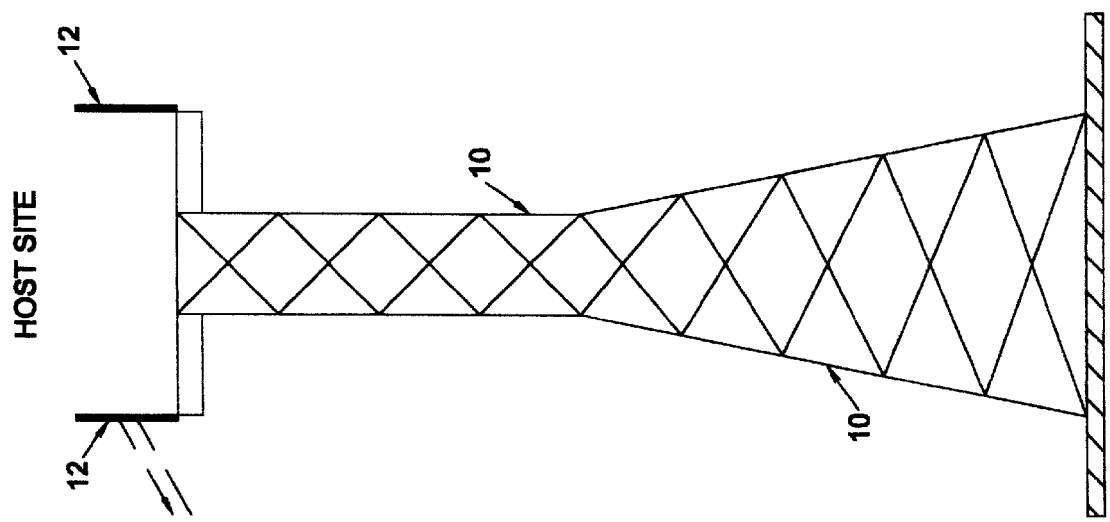
FIG. 1 is a plan view of a typical donor host tower transmitting a donor signal in a range of −40 to −90 dbm to the subject wireless server system. A parabolic signal receiver and transmitter and server antenna are shown mounted on a server tower.
Figure 1:
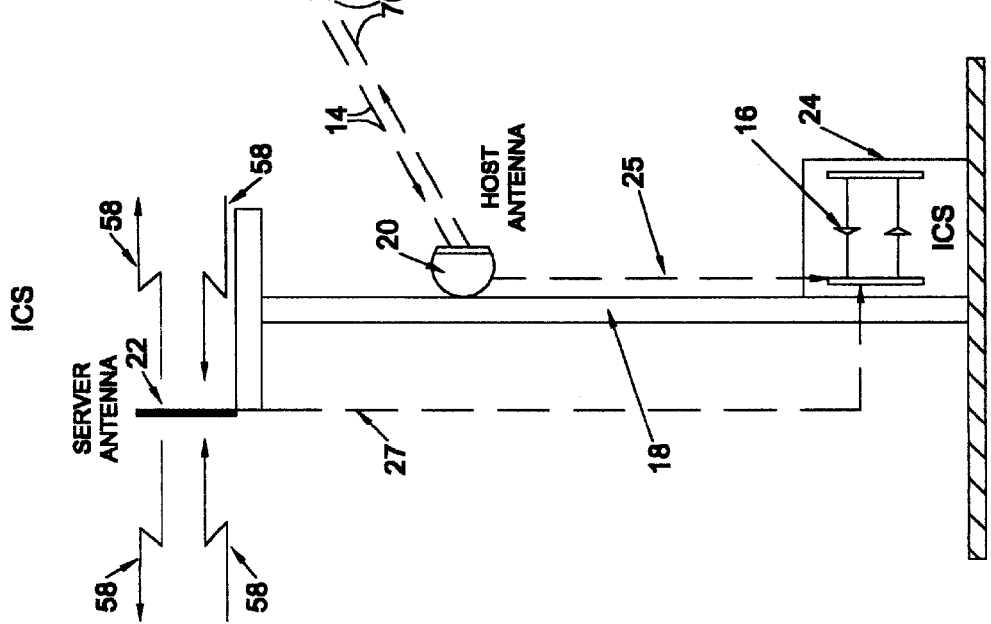

In FIG. 1, a typical donor host tower 10 is shown with a donor host antenna 12 radiating a donor transmit signal shown in dotted lines 14. The donor transmit signal 14 operates typically in an average range of −40 to −90 dbm during wireless telephone transmission. Also, the signal 14 will operate in a range of 880 Mhz and is capable of operating in an expanded range from 140 Mhz to 2 Ghz. The distance of the transmission of the signal 14 will vary from a few miles in a mountainous terrain to over 100 miles in a flat planer terrain.

The subject wireless telephone server system is shown having a general reference numeral 16. As mentioned above, the new server system 16 is designed to reproduce or clone the full, high power signal 14 of 880 Mhz with the same electromagnetic magnitude to a new geographical area. The system 16 is mounted on a server tower 18 and broadly includes a 4 to 10 foot parabolic collector 20, a directional server antenna 22 and a weather-proof housing 24 for storing the electrical components of the system 16 therein. The collector 20 acts both as a receiver and a transmitter. The collector 20 operates in receiving the signal 14, as mentioned above, typically in a range of 800 to 900 Mhz and with a magnitude inner gain in a range of 14 to 21 dBw. The server antenna 22 is designed to provide an "under and over" null to the main lobe of the antenna at a minimum of 40 dBw. The directional antenna 22 may cover from 30 to 360 degrees in direction.

Also shown in FIG. 1 and in dotted lines are feedline jumpers 25 and 27. The jumpers 25 and 27 are used for connecting the collector 20 to the antenna 22 via the electrical system stored in the housing 24 for producing a resonant match. It should be noted that the engineering of the matching of feedline jumpers 25 and 27 will not only produce a resonant match but also provide the losses of signal flow needed to insure maximum output with a VSWR of less than 1.49 to 1 or better than 14.1 dB of return loss.

Figure 2:
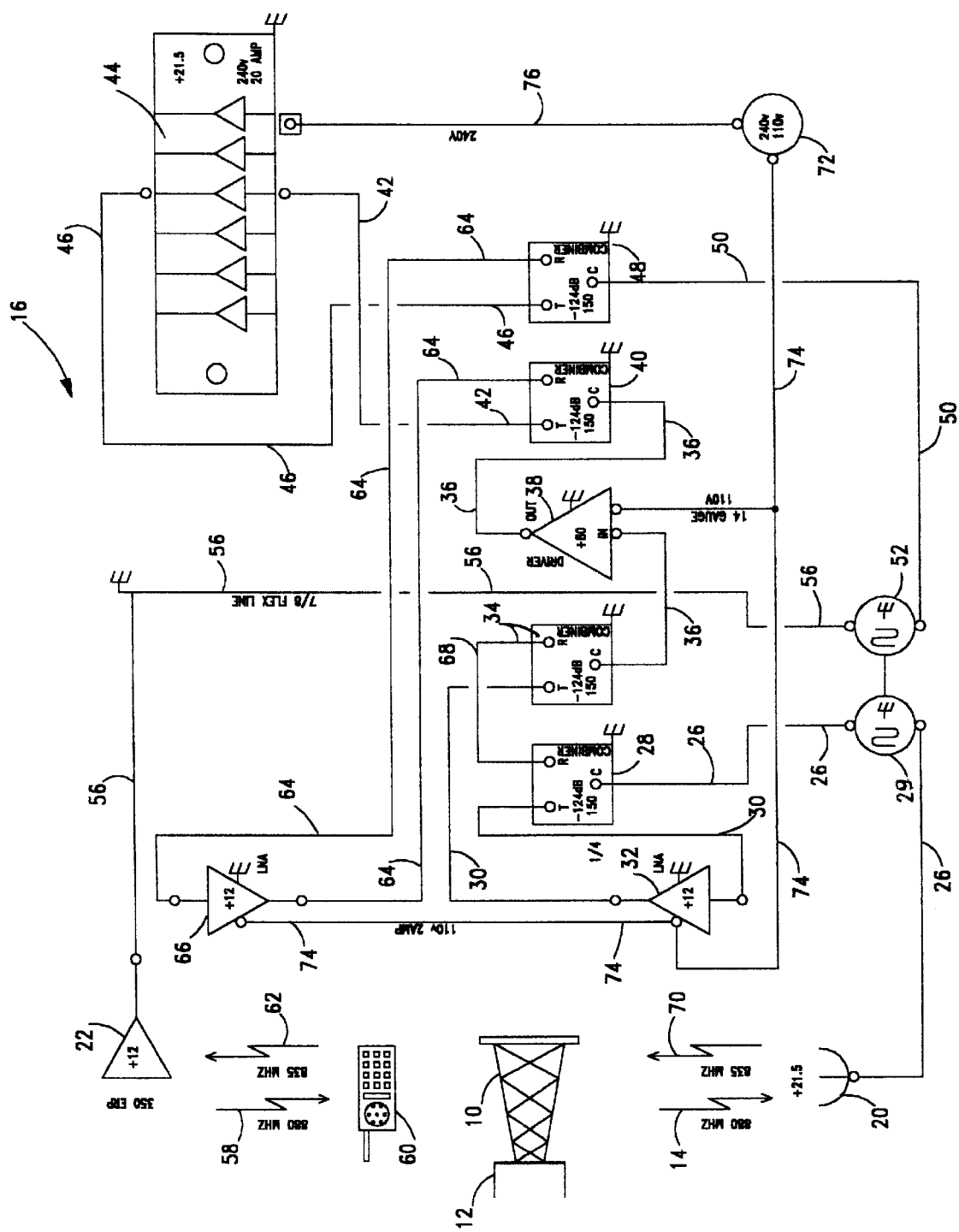
FIG. 2 is a block diagram illustrating the components making up the wireless server system used in cloning the donor signal from the host tower show in FIG. 1.

In FIG. 2, a block diagram illustrating the components making up the subject wireless server system 16 is shown for cloning the donor transmit signal 14 from the host tower 10 as show in FIG. 1. The components and function of the system 16 are described herein by following the transmission of the 880 Mhz signal 14 as received by the collector 20 and transmitted to the antenna 22 and received back at 835 Mhz. First, the donor transmit signal 14 leaves the collector 20 via a ½ inch flex line 26 and passes through a first lightning arrestor 27 to a common connector of a first duplexing device 28. From a transmit connector of the device 28, the signal 14 travels via a ¼ inch flex line 30 through a first low-noise amplifier 32 to a transmit connector of a second duplexing device 34. From a common connector of the device 34, the signal 14 travels via a ¼ inch flex line 36 through a bi-directional amplifier 38 to a common connector of a third duplexing device 40. From a transmit connector of the device 40, the signal 14 travel via a ¼ inch flex 42 to a first connector of a 140 watt full-unit amplifier 44. The amplifier 44 is designed not to allow any inter-modulation signal to develop to more than −68 dBw from the amplitude of the main carrier. The amplifier 44 is designed to insure interference free operation of the wireless system 16. From a second connector of the amplifier 44, the signal 14 travels via a ½ inch flex line 46 to a transmit connector of a fourth duplexing device 48. The bi-directional amplifier 38 in combination with the four duplexing devices 28, 34, 40 and 48 allow 124 dBw of isolation between the collector 20 and the antenna 22 of the system 16. From the common connector of the device 48, the signal 14 travels via a ½ inch flex line 50 through a second lightening arrestor 52. From the arrestor 52, the signal 14 completes its travel to the antenna 22 via a ⅞ inch flex line 54.

With the cloning of the 880 Mhz signal 14 from the collector 20 to the antenna 22, the system 16 now transmits a 880 Mhz server receive signal 58 to a wireless telephone 60. The wireless telephone 60 is now operating in a new expanded geographical area which heretofore was not able to either receive or transmit the donor transmit signal 14 from the donor host antenna 12.

When the wireless telephone 60 transmits a 835 Mhz server transmit signal 62 back to the antenna 22, the server transmit signal 62 travels via the flex line 56 to the second lightening arrestor 52 and through the flex line 50 to the connector of the fourth duplexing device 48. From a receive connector of the device 48, the signal 62 travels via a ¼ inch flex line 64 through a second low-noise amplifier 66 to a receive connector of the third duplexing device 40. Both the first low-noise amplifier 32 and the second low-noise amplifier are adjustable from 1 to 12 dBw in system gain. From a common connector of the device 40, the signal 62 travels via flex line 36 through the bi-directional amplifier 38 to the common connector of the second duplexing device 34. From a receive connector of the second duplexing device 34, the signal 62 travels via a ¼ inch flex line 68 to a receive connector of the first duplexing device 28. From the common connector of the first duplexing device 28, the signal 62 completes its travel via flex line 26 through the lightening arrestor 27 to the parabolic collector 20. A donor receive signal 70 is now transmitted from the collector at 835 Mhz back to donor host antenna 12. The donor receive signal 70 is shown in dotted line in FIG. 1. Also the server receive signal 58 and server transmit signal 62 received by and transmitted from the wireless telephone 60 are shown in FIG. 1.

The wireless system 16, as shown in FIG. 2, also includes a electrical power supply 72 of 110 volts which is connected to the first and second low noise amplifiers 32 and 66 via electrical line 74. Further, the power supply 72 provides 240 volts to operate the full-unit amplifier 44 via electrical line 76. Should the wireless system 16 use a 40 watt mini-unit amplifier rather than the 140 watt full-unit amplifier 44, then the 240 volt electrical supply will not be required. The 40 watt mini-unit amplifier, if used, is also designed not to allow any inter-modulation signal to develop to more than −68 dBw from the amplitude of the main carrier.

In operation, the subject wireless server system 16 operates unlike any other device used or marketed today for wireless coverage. The system functions under the speed of the electromagnetic wave and the phase delay of distance. The system uses calculated signal loss. Also, a linear approach is used to reproduce multiple functions without inter-modulation products (Imp's). The total electromagnetic isolation through a logical resonate filtering system provides for a 124 dB of isolation. Further, using a resonate designed antenna system, the wireless server system operates at no less than −127 dBm between the parabolic collector 20 and the system's server antenna 22.

Figure 3:
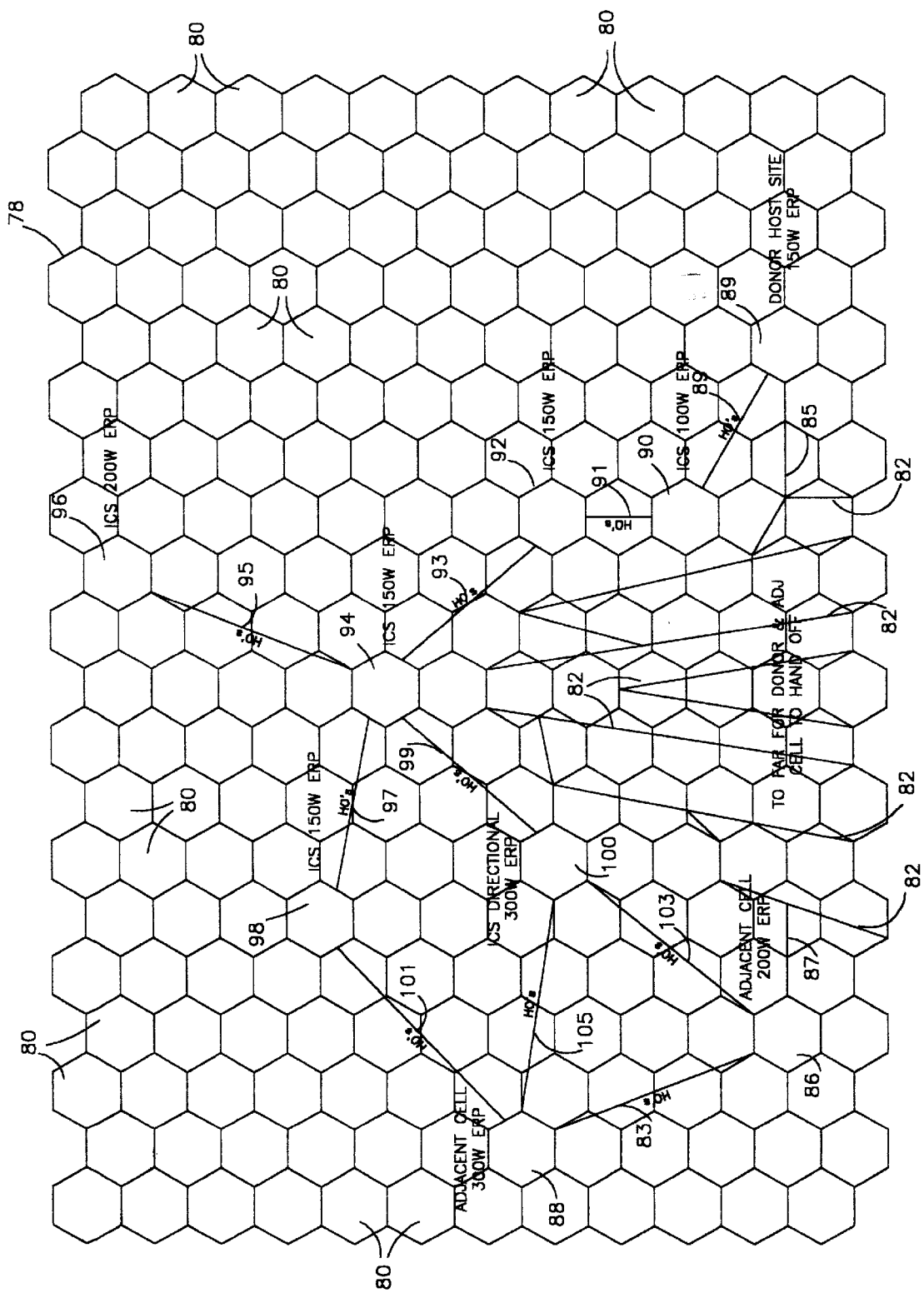
FIG. 3 illustrates a typical grid pattern of cell sites wherein a plurality of the subject wireless server systems are used in combination with a donor host base station and adjacent cells. The wireless server system is used to daisy-chain signal transmission around a geographic barrier such as a mountain range.

In FIG. 3, an illustration of a typical grid pattern having a general reference numeral 78 is shown having a plurality of hexagon cell sites 80 making up the grid pattern 78. The cell sites 80 may have an area of less than a 1 square mile in mountainous area and 10 to 20 square miles and greater in flat terrain. In this drawing, the grid pattern 78 includes a portion of a high mountain ridge 82 which acts a barrier as to signal transmission between a first donor host site 84 and two adjacent cell sites 86 and 88. The two adjacent cell sites 86 and 88 can communicate as indicated by arrow 83 but can not hand off signals to the donor host site 84 because of the mountains. For example, the donor host site 84 may have 150 watts of transmission power and the adjacent cell sites 86 and 88 may have 200 and 300 watts of transmission power. But with this power it is still not sufficient to hand off wireless signals between the donor host site 84 and the two adjacent cell sites 86 and 88. The donor host site 84 the adjacent cell sites 86 and 88 would have a tower 10 and antenna 12 similar to that as shown in FIG. 1. The blocked signal transmission between donor host site 84 and cell site 86 is indicated by arrows 85 and 87 Because of the mountain ridge 82 acting as a barrier, the subject invention as described under FIGS. 1 and 2 is used to provide a daisy chain of a plurality of wireless systems 16. The daisy chain allows wireless signal transmission around the mountain ridge 82 and avoids the great expense of building a donor host site on top of the mountain ridge 82.

In FIG. 3, the subject wireless system 16 is incorporated into a server cell site 90 having 100 watts of power and can easily hand off signals with the donor host site 84 as indicated by arrow 89. In turn, the cell site 90 can receive and transmit signals to an adjacent server cell site 92 as indicated by arrow 91. The server cell site 92, having 150 watts of power, responds back and forth to an adjacent server cell site 94 as indicated by arrow 93. The server cell site 94 is at one end of the mountain range 82 and has 150 watts of power. It should be mentioned, that all of the server cell site discussed under FIG. 3 incorporate the use of the subject invention described under FIGS. 1 and 2.

The server cell site 94 can respond to signals to three adjacent server cell sites. The sites are cell site 96 having 200 watts of power, cell site 98 having 150 watts of power and cell site 100 having 300 watts of power. The server cell site 94 responds to the server cell sites 96, 98 and 100 as indicated by arrows 95, 97 and 99. The above mentioned server cell site obviously can be used not only of transmitting and receiving signals from the donor host site 84 and adjacent cell sites 86 and 88, but also serve the surrounding communities requiring wireless telephone service. The server cell site 98 can hand off signals to adjacent cell site 88 as indicated by arrow 101. Also, the server cell site 100 can hand off signals to adjacent cell site 86, as indicated by arrow 103, and can hand off signals to adjacent cell site 88 as indicated by arrow 105. In this daisy chain manner, it can be seen that the subject invention can be economically used in increasing wireless service to remote communities along with greatly reducing signal transmission costs when overcoming geographic barriers is required.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A wireless telephone server system used for reproducing a wireless base station signal from a donor host base station and introducing a reproduced signal to a wireless telephone in a new geographical area, the server system comprising:

a parabolic collector for receiving the base station signal and transmitting the reproduced signal back to the base station;

a first pair of duplexing devices connected to said collector;

a second pair of duplexing devices connected to said first pair of duplexing devices;

a bi-directional amplifier connected between said first pair of duplexing devices and said second pair of duplexing a first low-noise amplifier connected between said first pair of duplexing devices;

a second low-noise amplifier connected between said second pair of duplexing devices;

a unit amplifier connected between said second pair duplexing devices;

a power source connected to said unit amplifier and said first and second low-noise amplifiers; and a server antenna connected to said second pair of duplexing devices for transmitting the reproduced signal to the wireless telephone and receiving a signal back from the wireless telephone and transmitting the signal back to the donor host base station via said parabolic collector.

2. The server system as described in claim 1 wherein said collector operates for receiving signals in a frequency range of 800 to 900 Mhz and with a magnitude inner gain in a range of 14 to 21 dBw.

3. The server system as described in claim 1 wherein said collector is connected to said server antenna using matching feedline jumpers to produce a resonant match, said server antenna designed to provide a "under and over" null to a main lobe of said server antenna at a minimum of 40 dBw.

4. The server system as described in claim 1 wherein said unit amplifier operates in a range of 40 watts and designed not to allow any inter-modulation signal to develop to more than −68 dBw from the amplitude of a main carrier, said unit amplifier insuring interference free operation.

5. The server system as described in claim 1 wherein said unit amplifier operates in a range of 140 watts and designed not to allow any inter-modulation signal to develop to more than −68 dBw from the amplitude of a main carrier, said unit amplifier insuring interference free operation.

6. A wireless telephone server system used for reproducing a wireless base station signal from a donor host base station and introducing a reproduced signal to a wireless telephone in a new geographical area, the server system comprising:

a signal receiver and transmitter for receiving the donor host base station signal and transmitting the reproduced signal back to the base station;

a first pair of duplexing devices connected to said signal receiver;

a bi-directional amplifier connected to said first pair of duplexing devices;

a low-noise amplifier connected to said first pair of duplexing devices;

a unit amplifier operating in a range of 40 to 140 watts, said unit amplifier connected to said first pair of duplexing devices; and a server antenna connected to said first pair of duplexing devices, said server antenna adapted for transmitting the reproduced signal to the wireless telephone and receiving a signal back from the wireless telephone and transmitting the signal to the donor host base station via said signal receiver and transmitter.

7. The server system as described in claim 6 wherein said signal receiver and transmitter is a parabolic collector.

8. The server system as described in claim 6 wherein said signal receiver and transmitter operates in a frequency range of 140 Mhz to 2 Ghz and with a magnitude inner gain in a range of 14 to 21 dBw.

9. The server system as described in claim 6 wherein said signal receiver and transmitter is connected to said server antenna using matching feedline jumpers to produce a resonant match, said server antenna designed to provide a "under and over" null to a main lobe of said server antenna at a minimum of 40 dBw.

10. The server system as described in claim 1 wherein said duplexing devices with said bi-directional amplifier allow 124 dBw of isolation between said signal receiver and said server antenna.

11. The server system as described in claim 6 further including a pair of low-noise amplifiers connected to said duplexing devices, said low-noise amplifiers adjustable from 1 to 12 dBw in system gain.

12. The server system as described in claim 6 wherein said unit amplifier is designed not to allow any inter-modulation signal to develop to more than −68 dBw from the amplitude of a main carrier, said unit amplifier insuring interference free operation.

13. The server system as described in claim 6 further including a lightning arrestor connected to said signal receiver and said server antenna.

14. A wireless telephone server system used for reproducing a wireless base station signal from a donor host base station and introducing a reproduced signal to a wireless telephone in a new geographical area, the server system comprising:

a parabolic collector for receiving the base station signal and transmitting the reproduced signal back to the base station;

a first pair of duplexing devices connected to said collector;

a bi-directional amplifier connected to said first pair of duplexing devices;

a first low-noise amplifier connected to said first pair of duplexing devices;

a unit amplifier connected to said first pair of duplexing devices;

a power source connected to said unit amplifier and said first low-noise amplifier; and a server antenna connected to said first pair of duplexing devices, said server antenna adapted for transmitting the reproduced signal to the wireless telephone and receiving a signal back from the wireless telephone and transmitting the signal back to the donor host base station via said parabolic collector.

15. The server system as described in claim 14 wherein said collector operates for receiving signals in a frequency range of 800 to 900 Mhz and with a magnitude inner gain in a range of 14 to 21 dBw.

16. The server system as described in claim 14 wherein said collector is connected to said server antenna using matching feedline jumpers to produce a resonant match, said server antenna designed to provide a "under and over" null to a main lobe of said server antenna at a minimum of 40 dBw.

17. The server system as described in claim 14 wherein said unit amplifier operates in a range of 40 watts and designed not to allow any inter-modulation signal to develop to more than −68 dBw from the amplitude of a main carrier, said unit amplifier insuring interference free operation.

18. The server system as described in claim 14 wherein said unit amplifier operates in a range of 140 watts and designed not to allow any inter-modulation signal to develop to more than −68 dBw from the amplitude of a main carrier, said unit amplifier insuring interference free operation.

* * * * *